(12) United States Patent
Halterman, Jr.

(10) Patent No.: US 7,789,335 B2
(45) Date of Patent: Sep. 7, 2010

(54) DRAG SYSTEM FOR A REEL

(75) Inventor: Danny R. Halterman, Jr., Navajo Dam, NM (US)

(73) Assignee: U.S. Reel - Missouri, LLC, St. Louis, MO (US)

( * ) Notice: Subject to any disclaimer, the term of this patent is extended or adjusted under 35 U.S.C. 154(b) by 87 days.

(21) Appl. No.: 12/208,993

(22) Filed: Sep. 11, 2008

(65) Prior Publication Data

US 2009/0065620 A1    Mar. 12, 2009

Related U.S. Application Data

(60) Provisional application No. 60/971,475, filed on Sep. 11, 2007.

(51) Int. Cl.
*A01K 89/01* (2006.01)
(52) U.S. Cl. .................................................. 242/246
(58) Field of Classification Search .................. 242/246
See application file for complete search history.

(56) References Cited

U.S. PATENT DOCUMENTS

| | | | | |
|---|---|---|---|---|
| 6,318,655 | B1 * | 11/2001 | Henze | 242/244 |
| 6,726,137 | B1 * | 4/2004 | Li | 242/238 |
| 6,857,589 | B2 | 2/2005 | Kitajima | |
| 7,077,350 | B2 * | 7/2006 | Koelewyn | 242/295 |
| 7,429,011 | B1 * | 9/2008 | Chang | 242/260 |
| 2003/0010856 | A1 * | 1/2003 | Katayama et al. | 242/246 |
| 2005/0103912 | A1 * | 5/2005 | Koelewyn | 242/303 |
| 2007/0295567 | A1 * | 12/2007 | Adams | 188/218 XL |
| 2008/0041999 | A1 * | 2/2008 | Nilsen | 242/246 |

FOREIGN PATENT DOCUMENTS

| | | |
|---|---|---|
| JP | 2000342129 A | 12/2000 |
| JP | 2006304689 A | 11/2006 |
| KR | 100665068 B1 | 1/2007 |

OTHER PUBLICATIONS

Written Opinion and Internatiional Search Report for International Application No. PCT/US2008/076029, mailing date: Apr. 6, 2009.

* cited by examiner

*Primary Examiner*—Emmanuel M Marcelo
(74) *Attorney, Agent, or Firm*—Polster Lieder Woodruff & Lucchesi, LC

(57) ABSTRACT

A drag system for a spinning reel comprised of a spool assembly 10, a drag washer assembly 12, and a drag knob assembly 14 that interact to create specific drag performance characteristics.

32 Claims, 2 Drawing Sheets

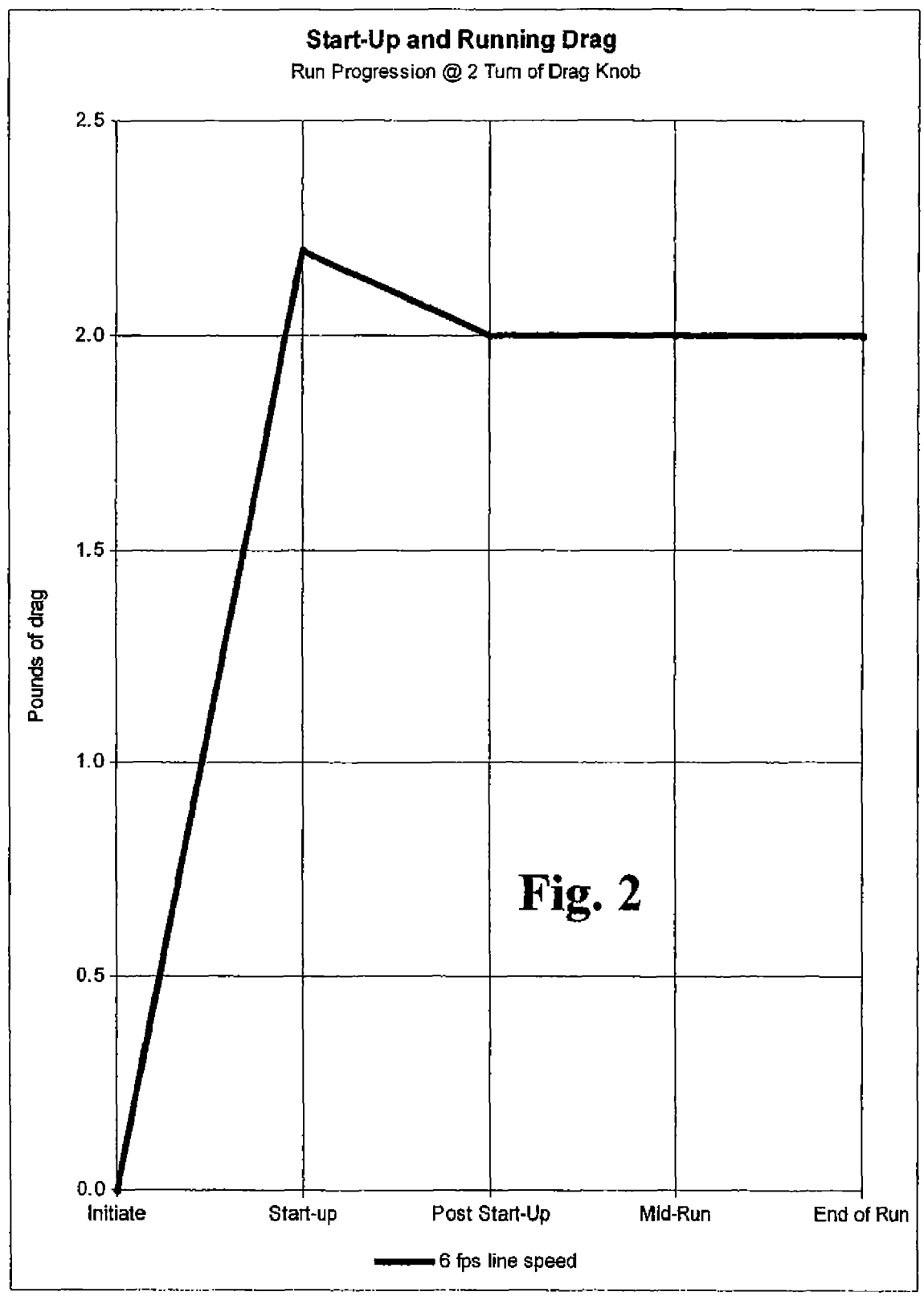

DRAG SYSTEM FOR A REEL

CROSS-REFERENCED TO RELATED APPLICATIONS

Figure 1:
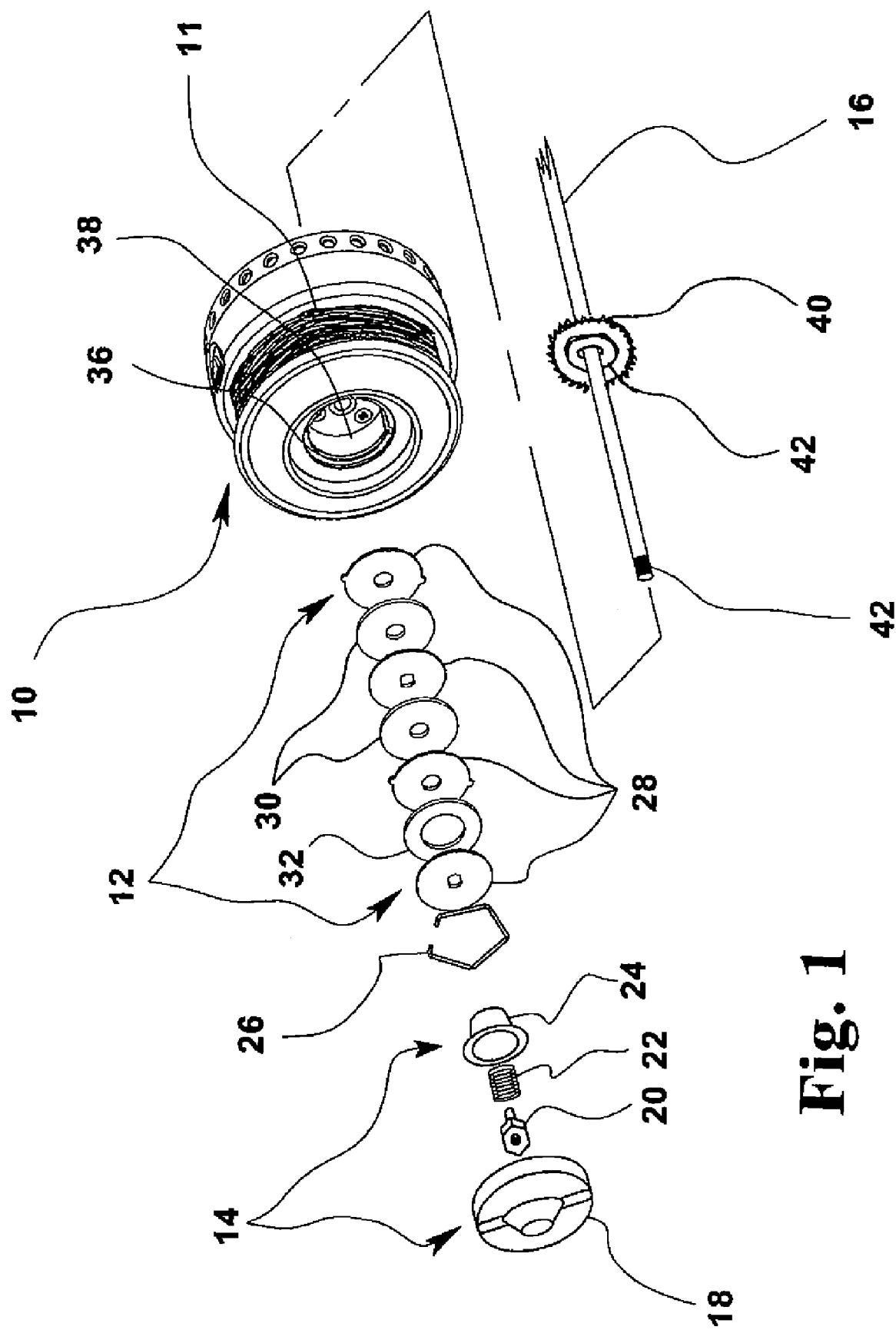

The present application claims priority to U.S. Provisional Patent Application No. 60/971,475, filed Sep. 11, 2007, the contents of which are incorporated herein by reference.

FIELD OF THE INVENTION

This invention relates to the creation of a spinning reel drag system comprising a drag washer assembly, a drag knob assembly and a drag adjustment spring that functionally interact to create specified drag performance characteristics.

BACKGROUND OF THE INVENTION

Friction devices, or so called "drag systems" have been designed into fishing reels for many decades, if not more than a century. Some of the earliest reels utilized an educated thumb or finger pressed against the spinning spool of line to create friction, thus slowing down a fish that was hooked and running away. Early on in the evolution of fishing reels, mechanical devices were introduced which accomplished this same objective in a less subjective and, sometimes, less painful manner. The numbers of systems and the way they functioned are essentially countless.

Regardless, a fishing reel drag typically requires three essential elements in functional interaction. First, it must have a drag adjustment knob which can be grasped and tightened to apply pressure to the drag mechanism. This is typically a threaded knob tightening on the end of a threaded shaft onto which the drag mechanism is spindled. The drag mechanism itself is another essential element and typically consists of various types of materials in resistive or frictional contact. The third important element is the drag adjustment spring which moderates the tightening effect of the drag knob on the drag mechanism. The spring allows pressure to be applied to the drag mechanism more gradually and evenly, thus creating friction more gradually than would be possible with just the threaded drag knob itself.

Line is then removed from a spinning reel spool by a fleeing fish against the friction created by this drag system. The friction created has to be sufficient to slow the fish, thus tiring it, and yet not become so great as to cause the line to break. Typically, a desirable setting for a drag system on a spinning reel is no more than 25% to 30% of the breaking strength of the line.

Due to the counter-intuitive nature of the laws of friction, most of the drag systems that have been created to date probably do not function in the way their inventor envisioned. While most spinning reel drags are comprised of some version of the three basic elements described above, very little good science has been utilized to date to objectively measure just how predictably and reliably these various mechanisms really function. For the most part, a successfully landed fish has been considered proof enough that the system was working. But many times fishing adventures have not ended that successfully. When the failure was attributable to the drag mechanism, no one actually knew for sure, and "The big one got away."

The basic laws of friction for surfaces in dry contact that relate to creating a spinning reel drag system are as follows:

1. The amount of friction created is directly proportional to the normal force (amount of pressure applied) between the surfaces in contact.

2. The amount of friction created by surfaces in frictional contact is independent of the areas in contact so long as the normal force (applied pressure) remains the same.

3. At low velocities (as in spinning reel drags) the friction is independent of the velocity between the surfaces in frictional contact, except that as the velocity increases, the friction decreases. The exception to this is that soft materials such as rubber, leather, cork, and other soft plastics as are used in reel drags do not follow these rules to the letter. These soft materials will to a degree create more friction as the velocity increases, and create more friction as the surface area increases. The degree of change from the standard rules varies greatly depending on the material in question.

The basic laws of friction for lubricated surfaces are much different and some very complicated results can occur:

1. The amount of friction created is almost independent of the normal force (pressure applied) acting upon the surfaces.

2. The amount of friction for well lubricated surfaces depends to a great extent on the temperature of the surfaces.

3. If the contact surfaces are flooded with oil (as many reel drags are), the amount of friction is almost independent of the nature of the surfaces until the lubrication becomes less ample and then the friction becomes more dependent on the nature of the materials in contact. What this means for the angler and reel drag designer is that lubricated drag systems may never perform predictably, reliably, or consistently. Even placing a fishing reel on the deck of a boat exposed to hot tropical sun can change its performance drastically before the first cast is made.

In fact, little consideration has been given in prior art to the problems created by the combination of pressure and heat on the drag mechanism surfaces in frictional contact, indeed to how the laws of friction operate in general concerning spinning reel drag systems. As frictional drag mechanisms generate heat, thermal expansion of the drag mechanism materials may create profound changes in the drag systems performance, essentially causing an increase in drag forces much the same as would be accomplished by further tightening the drag knob, thus creating more pressure on the drag adjustment spring and more pressure on the drag mechanism. Also, with heat and pressure, many of the commonly used drag system materials are known to go through changes at their contact surfaces which can cause the drag forces to fade, thus drag performance is diminished. The prior art has given little consideration to these problems. No viable solutions have been offered which might combine drag materials, or create better heat sinks to absorb the generated heat, making for more reliable performance.

Many different types of materials, compression springs, and drag adjustment knobs have been conjoined to create what was believed by its creator to be the ultimate spinning reel drag. "Smooth" has always been the catch word used to describe how well the drag friction system would allow line to be removed from the spool during a fish fight. Unfortunately, little other science has been used to clearly establish the performance characteristics of these ultimate drags. And while many drag systems are smooth when line is pulled from the spool by hand, what actually happens beyond that point with a fish on and line screaming from the reel has never been clearly described prior to the present invention.

In summary, it is apparent that a spinning reel drag system is needed that will perform beyond what "feels good to the hand." A system of drag washers is needed with qualities that will interact with an adequate heat sink to create a so called "flat running drag." A flat running drag is a drag performance characteristic in which the amount of drag force created by a running spool does not vary from the time the line begins to flow from the spool, until the line on the spool is exhausted.

What is further needed is a spinning reel drag system that does not utilize oils or grease, and is virtually maintenance free requiring only an occasional wipe from a dry cloth to keep the drag system operating exactly the same from fish to fish and from outing to outing.

BRIEF SUMMARY

Accordingly, the present invention has at least one of the following objects and advantages:

(a) to provide a drag system for a spinning reel which coordinates the characteristics of the drag knob, the drag compression spring, and the size, number, shape, and material from which the drag washers are made, to achieve a so-called "flat running drag,"

(b) to provide an adequate heat sink for the drag system of a spinning reel so that thermal expansion of the drag components is controlled to achieve the desired drag performance, (c) to provide a drag system that operates without oil and grease, and which can be maintained by simply wiping the washers down occasionally with a dry cloth, thus returning the performance of the system to its original level.

These and other objects and advantages of the present invention, along with features of novelty appurtenant thereto, will appear or become apparent in the course of the following descriptive sections.

BRIEF DESCRIPTION OF THE DRAWING FIGURES

FIG. 1 is an exploded view of a reel having a drag system according to an embodiment of the present invention; and FIG. 2 is a graph of line drag versus time for a reel having a drag system according to an embodiment of the present invention.

REFERENCE NUMERALS IN DRAWINGS

10—spool assembly
11—spooled line
12—drag washer assembly
14—drag knob assembly
16—main shaft
18—drag knob
20—nut
22—drag adjustment spring
24—drag knob insert
26—retaining clip
28—metallic washers
30—Rulon J
32—Rulon LR
36—groove
38—drag well
40—spool stop ratchet
42—spool stop washer
44—threads

DETAILED DESCRIPTION OF THE PREFERRED EMBODIMENT

Spinning reels are manufactured by an array of manufactures in both the United States and abroad. Much of the material from which the present assembly is manufactured is common, and easily obtained from one of these numerous companies. However, the drag washers are manufactured from stainless steel and a mixture of one or more from such materials as Teflon, Rulon, Delrin, Delron, Broflon, and a broad range of other so-called "space age" plastics obtainable from a number of different companies, such as DuPont or Tri-Star. Drag performance testing was done on the Dragenstein radial friction instrument in Navajo Dam, N. Mex.

Referring to FIG. 1, there is shown a schematic view of a preferred embodiment for a spinning reel spool assembly 10, drag washer assembly 12, and drag knob assembly 14. The spool assembly 10 with spooled line 11 is spindled onto the main shaft 16 and comes to rest against the spool stop washer 42 and spool stop ratchet 40. A drag well 38 is provided in the spool assembly 10, into which the drag washer assembly 12, comprised of metallic washers 28, Rulon LR washer 32, and Rulon J washers 30, are inserted and held in place by the retaining clip 26, in the groove 36 in the drag well 38. The drag knob assembly 14, comprised of the drag knob 18, threaded nut 20, drag adjustment spring 22, and drag knob insert 24, is then tightened onto the threads 44 of the main shaft 16 by engaging the threaded nut 20 inside of the drag knob assembly 14.

Referring to FIG. 2 is a representative graph of the start-up and running drag for the spinning reel drag system of the preferred embodiment, run at a line speed of 6 feet per second (1.8288 meters per second) with two 360 degree turns of the drag knob, representing 2 pounds (907.184 grams) of drag. This clearly describes a flat running drag with an anticipated small start-up pulse of about 2.2 pounds (997.903 grams) of drag. After the start-up pulse, the drag drops back to 2 pounds (907.184 grams) and runs flat from start to the end of the line contained on the spool.

While the figures depict a typical embodiment and set of performance characteristics of the present invention, it should be noted that there exists a very broad range of sizes, materials, and performance characteristics that will work to create additional embodiments. The primary objective of the present invention is to make it possible to design a spinning reel drag system that will perform correctly in the fishing application for which it was intended, whether in fresh water or salt water. Variables might include changing the amount of friction that a fishing reel drag system could yield to achieve more, or fewer pounds of drag.

A number of other materials might be combined to achieve a flat running drag system, each contributing specific characteristics that work together to achieve the desired results. It can be seen that the numbers of variables that can be manipulated to achieve the desired results are limitless. The forgoing discussion should not be considered as limiting, but rather as demonstrating only one typical embodiment of the present invention.

OPERATION

By utilizing the specific characteristics of some special plastics and metals, the present invention balances those characteristics to offset each other and create what is called a "flat running" drag as is depicted in FIG. 2. To achieve this it was necessary to experiment with various drag washer assemblies 12, utilizing different blends of the various washers, including, the metallic washers 28, and the various other plastic washers 30, 32. In addition, it was essential to find an exact drag adjustment spring 22 with suitable compression characteristics, and a suitable thread count for the nut 20 and threads 44 of the main shaft 16, which would interact to yield a flat running drag as depicted in FIG. 2. As these components interacted in a testing event on the Dragenstein instrument, heat was generated by the friction and it was essential for the drag washer assembly 12 to make adequate conductive contact with the aluminum spool assembly 10 to provide an adequate heat sink. Aluminum of course, has excellent specific heat conductance properties to make a good heat sink for the heat generated by the drag washer assembly 12.

To discover these variables, the spool assembly 10 with spooled line 11, drag washer assembly 12, and drag knob assembly 14, were assembled onto the main shaft 16 of a spinning reel body. Rulon LR 32 and Rulon J 30 washers were chosen for this preferred embodiment for their known frictional characteristics. It is well known that under sufficient heat and pressure, friction created between Rulon J 30 plastic washers and the other metallic washers 28 tends to decrease after sufficient heat is generated. This is in spite of the thermal expansion of the metallic washers 28 and Rulon J 30 plastic washers. To counteract this tendency to fade, an additional Rulon LR 32 plastic washer was utilized. It is known that Rulon LR 32 plastic washers do not show the decreasing frictional characteristics of Rulon J 30. It was then necessary to experiment with various sizes and shapes of Rulon LR 32 plastic washers to come up with just the correct size, shape, and amount of friction to compensate for the fade of the Rulon J 30 plastic washers.

To test this fully assembled spinning reel, the system was subjected to a series of tests and runs on the Dragenstein instrument. By continuing to experiment with various ratios of Rulon J 30 and Rulon LR 32 plastic washers, it was possible to match these elements so that a so called, "flat running drag" was achieved.

Typical specifications for this embodiment are as follows:
Spool assembly 10—comprised of approximately 38 grams of aluminum
Metallic washers 30—two martensitic stainless steel washers, indexed to the main shaft 16, 0.750" OD×0.190" ID×0.030" (19.05 mm OD×4.826 mm ID×0.762 mm thick), and
two martensitic stainless steel washers, indexed to the drag well 38, 0.750" OD×0.160" ID×0.030" thick (19.05 mm OD×4.064 mm ID×0.762 mm thick)
Rulon J 30 plastic washers—two washers, 0.750" OD×0.190" ID×0.030" thick (19.05 mm OD×4.826 mm ID×0.762 mm thick)
Rulon LR 32 plastic washer—one washer, 0.750" OD×0.438" ID×0.030" thick (19.05 mm OD×4.826 mm ID×0.762 mm thick)
Nut 20 and corresponding threads 44—4 mm×0.7
Drag adjustment spring 22—
uncompressed height 0.340"×0.340" OD×0.215" ID (8.636 mm"×8.636 mm OD×5.461 mm ID)
martensitic stainless steel, full hard, 0.058" (1.473 mm) diameter, four turns

SUMMARY

From the description above, it becomes evident that the present invention has a number of advantages. Therefore the drag system for a spinning reel herein described:

(a) provides a drag system for a spinning reel which coordinates the characteristics of the drag knob, the drag compression spring, and the size, number, shape, and material from which the drag washers are made, to achieve a so-called, "flat running drag", (b) provides an adequate heat sink for the drag system of a spinning reel so that thermal expansion of the drag components is controlled to a achieve the desired drag performance, (c) provides a drag system that operates without oil and grease, and which can be maintained by simply wiping the washers down occasionally with a dry cloth, thus returning the drag system to its original performance level.

Thus the reader will see from the forgoing discussion that the spinning reel drag system as herein described provides a number of improvements over the prior art. Whereas in the past, an angler had to trust his sense of feel in adjusting the drag on his spinning reel, he can now adjust confidently to a desired drag setting and trust that it will be what it is supposed to be when connecting with the fish of a lifetime. Therefore, in every instance, the angler who is using the present drag system in his spinning reel will find his pleasure and success in fishing to be improved.

While my above description contains much specificity, these should not be construed as limitations on the scope of the invention, but rather as an exemplification of one preferred embodiment. Many other variations are possible. Accordingly, the scope of the invention should be determined not by the embodiments illustrated, but by the appended claims and their legal equivalents.

I claim:

1. A drag system for a reel comprising:
(a) a spool assembly attached to a main shaft;
(b) a drag washer assembly attached to the main shaft, the drag washer assembly comprising two or more washers of dissimilar materials and metallic washers, and held in place in the spool assembly, the washers of dissimilar metals comprising at least a first washer having a coefficient of friction that increases with increased heat and a second washer having a coefficient of friction wherein friction decreases with increased heat; and
(c) a drag knob assembly tightened onto threads of the main shaft, the drag knob assembly comprising a drag knob, a threaded nut, a drag adjustment spring, and a drag knob insert.

2. The drag system of claim 1 wherein the drag washers are inserted into a drag well in the spool assembly.

3. The drag system of claim 1 wherein the spring comprises a spring having an uncompressed height of approximately 0.340" with an approximately 0.340" OD and an approximately 0.215" ID (approximately 8.636 mm with an approximately 8.636 mm OD and an approximately 5.461 mm ID) and made from martensitic stainless steel, full hard having approximately 0.058" (approximately 1.473 mm) diameter wire and having approximately four turns.

4. The drag system of claim 1 wherein the two or more washers comprise two or more plastic washers.

5. The drag system of claim 4 wherein at least one of the two or more plastic washers of dissimilar materials is selected from the group consisting of Teflon, Rulon, Delrin, Delron and Broflon.

6. The drag system of claim 4 wherein at least two of the two or more plastic washers of dissimilar materials are selected from the group consisting of Teflon, Rulon, Delrin, Delron and Broflon.

7. The drag system of claim 4 wherein all of the two or more plastic washers of dissimilar materials are selected from the group consisting of Teflon, Rulon, Delrin, Delron and Broflon.

8. The drag system of claim 4 wherein two of the two or more plastic washers of dissimilar materials comprise a Rulon J plastic washer and a Rulon LR plastic washer.

9. A drag system for a reel comprising:
a spool assembly attached to a main shaft;

a drag washer assembly attached to the main shaft, the drag washer assembly comprising two or more washers of dissimilar materials and metallic washers, and held in place in the spool assembly, the washers of dissimilar metals comprising at least a first washer having a coefficient of friction that increases with increased heat and a second washer having a coefficient of friction that decreases with increased heat; and means for applying an adjustable quantity of pressure to the drag washer assembly.

10. The drag system of claim 9 wherein the drag washers are inserted into a drag well in the spool assembly.

11. The drag system of claim 9 wherein the spring comprises a spring having an uncompressed height of approximately 0.340" with an approximately 0.340" OD and an approximately 0.215" ID (approximately 8.636 mm with an approximately 8.636 mm OD and an approximately 5.461 mm ID) and made from martensitic stainless steel, full hard having approximately 0.058" (approximately 1.473 mm) diameter wire and having approximately four turns.

12. The drag system of claim 9 wherein the two or more washers comprise two or more plastic washers.

13. The drag system of claim 12 wherein the at least one of the two or more plastic washers of dissimilar materials is selected from the group consisting of Teflon, Rulon, Delrin, Delron and Broflon.

14. The drag system of claim 12 wherein at least two of the two or more plastic washers of dissimilar materials are selected from the group consisting of Teflon, Rulon, Delrin, Delron and Broflon.

15. The drag system of claim 12 wherein all of the two or more plastic washers of dissimilar materials are selected from the group consisting of Teflon, Rulon, Delrin, Delron and Broflon.

16. The drag system of claim 12 wherein two of the two or more plastic washers of dissimilar materials comprise a Rulon J plastic washer and a Rulon LR plastic washer.

17. A drag system for a reel having a spool assembly attached to a main shaft capable of maintaining an approximately constant level of drag upon the spool while spinning after an initial startup period of the spinning spool, the drag system comprising two or more washers of dissimilar materials comprising at least a first washer having a drag curve wherein friction increases with increased heat and a second washer having a drag curve wherein friction decreases with increased heat.

18. The drag system of claim 17 wherein the drag system maintains an approximately constant level of drag upon the spool while spinning after an initial startup period when the spool is spun at rotational speeds necessary to unspool 6 feet of line per second (1.8288 meters per second).

19. The drag system of claim 17 wherein the two or more washers comprise two or more plastic washers.

20. The drag system of claim 19 wherein at least one of the two or more plastic washers of dissimilar materials is selected from the group consisting of Teflon, Rulon, Delrin, Delron and Broflon.

21. The drag system of claim 19 wherein at least two of the two or more plastic washers of dissimilar materials are selected from the group consisting of Teflon, Rulon, Delrin, Delron and Broflon.

22. The drag system of claim 19 wherein all of the two or more plastic washers of dissimilar materials are selected from the group consisting of Teflon, Rulon, Delrin, Delron and Broflon.

23. The drag system of claim 19 wherein two of the two or more plastic washers of dissimilar materials comprise a Rulon J plastic washer and a Rulon LR plastic washer.

24. A drag system for a reel having a spool attached to a main shaft comprising:

means for maintaining an approximately constant level of drag upon the spool while spinning after an initial startup period of the spinning spool, the drag system comprising two or more washers of dissimilar materials, the washers of dissimilar metals comprising at least a first washer having a drag curve wherein friction increases with heat and a second washer having a drag curve wherein friction decreases with heat; and means for applying an adjustable quantity of pressure to the drag washer assembly.

25. A drag system for a reel comprising:

a spool assembly attached to a main shaft;

a drag washer assembly connected to the main shaft, the drag washer assembly comprising two or more washers of dissimilar materials and metallic washers, and held in place in the spool assembly, the washers of dissimilar metals comprising at least a first washer having a coefficient of friction that increases with increased heat and a second washer having a coefficient of friction that decreases with increased heat; and means for applying an adjustable quantity of pressure to the drag washer assembly.

26. The drag system of claim 25 wherein the two or more washers comprise two or more plastic washers.

27. The drag system of claim 26 wherein at least one of the two or more plastic washers of dissimilar materials is selected from the group consisting of Teflon, Rulon, Delrin, Delron and Broflon.

28. The drag system of claim 26 wherein at least two of the two or more plastic washers of dissimilar materials are selected from the group consisting of Teflon, Rulon, Delrin, Delron and Broflon.

29. The drag system of claim 26 wherein all of the two or more plastic washers of dissimilar materials are selected from the group consisting of Teflon, Rulon, Delrin, Delron and Broflon.

30. The drag system of claim 26 wherein two of the two or more plastic washers of dissimilar materials comprise a Rulon J plastic washer and a Rulon LR plastic washer.

31. The drag system of claim 25 wherein the drag washers are inserted into a drag well in the spool assembly.

32. The drag system of claim 25 wherein the spring comprises a spring having an uncompressed height of approximately 0.340" with an approximately 0.340" OD and an approximately 0.215" ID (approximately 8.636 mm with an approximately 8.636 mm OD and an approximately 5.461 mm ID) and made from martensitic stainless steel, full hard having approximately 0.058" (approximately 1.473 mm) diameter wire and having approximately four turns.

* * * * *